(12) United States Patent
Wilchesky et al.

(10) Patent No.: US 12,260,782 B2
(45) Date of Patent: Mar. 25, 2025

(54) SYSTEMS OF FLIGHT SIMULATION AND METHODS OF OPERATING SAME

(71) Applicant: D&D Skunkworks Inc., North York (CA)

(72) Inventors: Daniel Wilchesky, Toronto (CA); Daniel Stopnicki, Toronto (CA)

(73) Assignee: D&D Skunkworks Inc., North York (CA)

( * ) Notice: Subject to any disclaimer, the term of this patent is extended or adjusted under 35 U.S.C. 154(b) by 0 days.

(21) Appl. No.: 18/378,721

(22) Filed: Oct. 11, 2023

(65) Prior Publication Data
US 2024/0119858 A1    Apr. 11, 2024

Related U.S. Application Data

(60) Provisional application No. 63/440,970, filed on Jan. 25, 2023, provisional application No. 63/415,084, filed on Oct. 11, 2022.

(51) Int. Cl.
*G09B 9/12*      (2006.01)
*G09B 9/30*      (2006.01)

(52) U.S. Cl.
CPC .............. *G09B 9/12* (2013.01); *G09B 9/302* (2013.01)

(58) Field of Classification Search
CPC .................................. G09B 9/302; G09B 9/12
See application file for complete search history.

(56) References Cited

U.S. PATENT DOCUMENTS 4,527,980 A * 7/1985 Miller .................... G09B 9/302
                                               472/130
4,710,129 A * 12/1987 Newman ................. G09B 9/12
                                                434/45

(Continued)

FOREIGN PATENT DOCUMENTS

DE           19900442 A1     7/2000

OTHER PUBLICATIONS

UK Intellectual Property Office, Search Report dated Jul. 27, 2023, for UK Patent Application No. GB2301170.3.

*Primary Examiner* — Xuan M Thai
*Assistant Examiner* — Sadaruz Zaman
(74) *Attorney, Agent, or Firm* — Norton Rose Fulbright Canada LLP

(57) ABSTRACT

Systems for flight simulation, and methods for operating the same. The system may include a 6 degree of freedom devices, a multi-point harness configured to suspend a user above a ground surface, and a sensor circuit integrated with a user-facing surface of the multi-point harness to detect changes in distribution of weight across the user-facing surface. The system includes a processor coupled to the sensor circuit, where the processor may be configured to: detect a shift in weight distribution across the user-facing surface of the multi-point harness. The processor may generate at least one virtual physics parameter associated with the detected shift in weight distribution. The at least one virtual physics parameter representing a force associated with a change in center of gravity of the user. The processor may modulate the 6 DOF device to orient the multi-point harness based on at least one virtual physics parameter to simulate a resultant trajectory of the user during the flight simulation.

14 Claims, 11 Drawing Sheets

(56) References Cited

U.S. PATENT DOCUMENTS

| | | | | |
|---|---|---|---|---|
| 5,299,810 | A * | 4/1994 | Pierce | A63F 13/285 |
| | | | | 463/2 |
| 10,265,237 | B2 * | 4/2019 | Devanaboyina | A61M 21/02 |
| 10,650,694 | B2 * | 5/2020 | Rozenberg | G09B 9/02 |
| 10,657,717 | B2 * | 5/2020 | Hollis | G09B 19/165 |
| 10,878,714 | B2 * | 12/2020 | Liberatore | G09B 9/14 |
| 10,957,216 | B2 * | 3/2021 | Delisle | G09B 9/048 |
| 10,994,216 | B2 * | 5/2021 | Board | A63F 13/65 |
| 11,398,162 | B2 * | 7/2022 | Delisle | G09B 9/12 |
| 11,715,387 | B2 * | 8/2023 | Delisle | G09B 9/24 |
| | | | | 434/32 |
| 2006/0058023 | A1 * | 3/2006 | White | B64G 7/00 |
| | | | | 455/427 |
| 2013/0017893 | A1 * | 1/2013 | Feuer | A63G 7/00 |
| | | | | 472/43 |
| 2015/0302756 | A1 * | 10/2015 | Guehring | G06F 17/10 |
| | | | | 434/44 |
| 2016/0275809 | A1 * | 9/2016 | Cho | G06F 3/011 |
| 2017/0025031 | A1 * | 1/2017 | Dreyer | G09B 9/12 |
| 2019/0318646 | A1 * | 10/2019 | Yeom | G09B 9/00 |
| 2020/0143699 | A1 * | 5/2020 | Pashayev | G09B 9/307 |
| 2021/0241645 | A1 * | 8/2021 | Onur | G09B 9/08 |
| 2022/0335850 | A1 * | 10/2022 | Klassen | G06N 3/049 |

\* cited by examiner

SYSTEMS OF FLIGHT SIMULATION AND METHODS OF OPERATING SAME

CROSS REFERENCE TO RELATED APPLICATIONS

This application claims priority from U.S. provisional patent application No. 63/440,970, filed Jan. 25, 2023, and from U.S. provisional patent application No. 63/415,084, filed Oct. 11, 2022, the entire contents of which are hereby incorporated by reference herein.

FIELD

The disclosure relates generally to the field of simulated physics, and more particularly to accurately replicating the position or orientation of a human-portable flight vehicle device in a simulated environment.

BACKGROUND

Human-portable flight vehicles or lifting devices are depicted in the realm of science fiction. Human-portable flight vehicles may also be provided in reality. Such human-portable lifting devices may be configured for limited-duration operation for elevating a user in space. The user may navigate their trajectory through space based on providing input to the lifting devices. As an example, lifting devices, backpacks, or suits may include pressurized hydrogen peroxide devices catalyzed at a nozzle. Such flight or lifting devices may create thrust or propulsion forces for conveying a user through space.

SUMMARY

The present disclosure describes systems for flight simulation and methods of operating such systems. In some examples, flight simulation systems may include input devices configured to receive user input for providing a user with a simulated flight experience.

To enrich or compliment user input received at mechanical input devices, it may be desirable to provide systems of flight simulation whereby users may interact in a non-scripted manner with a virtual world by advancing a trajectory of the user through space based on changes of position or orientation of the user's physical body or peripheral limbs. Such embodiments of flight simulation systems may be configured to simulate human-portable flight vehicles, such as human-portable flight backpacks, vehicles, or lifting bodies. Embodiments of flight simulation systems described in the present disclosure may be configured as an entertainment product or as a training device for real-life human-portable flight vehicle devices.

Embodiments of flight simulation systems described in the present disclosure may include a mechanical system including a 6 degree of freedom (6 DOF) device coupled to a multi-point harness. The multi-point harness may be configured to suspend a user above a ground surface.

The system may include computer-implemented operations for detecting shifts in weight distribution of the user, and generating one or more virtual physics parameters representing forces associated with changes in center of gravity of the user. In some scenarios, the virtual physics parameters may represent changes in vehicle thrust vectors. The one or more virtual physics parameters may be based on a combination of (1) a change in a user's center of gravity (e.g., based on user shifting body weight) and (2) a change in the user's limb position or orientation, thereby contributing to a change in the user's center of gravity or changes in thrust vectors. By detecting such changes in the user's body parts associated with a change in the user's center of gravity, the system may provide simulated haptic or tactile feedback to a user whilst simulating a resultant trajectory of the user through a flight path.

In some embodiments, the system may modulate the 6 DOF device to provide the user with a simulated resultant trajectory of the user during the flight simulation. For example, the 6 DOF device manipulate the multi-point harness to bias the user's body position to one direction, or raise the multi-point harness relative to the ground surface to impart a sensation of lift to the user.

In some embodiments, the system may include a head-mounted virtual reality display device for concurrently providing a visual simulated experience. In some embodiments, visualizations provided by the head-mounted virtual reality display device may reflect changes in the center of gravity of the user whilst navigating a trajectory through space. Based on visualization updates, the user may continue to navigate the virtual environment based on changes to the user's body parts or changes in the user's center of gravity, thereby providing an immersive simulated flight based on a combination of a virtual reality and motion platform.

In some embodiments, the system may include air-flow inducing devices for generating air flow to provide haptic or tactile feedback to impart to the user a sense of velocity whilst traversing a trajectory of a simulated flight.

In some embodiments, the multi-point harness may include resistance measurement devices integrated with a user-facing surface of the multi-point harness for detecting distribution of weight on the multi-point harness. When a user is suspended in the multi-point harness, changes in position of the user (e.g., a mass) about the multi-point harness may be associated with a change in gravitational forces (e.g., center of gravity) acting on the user. Embodiments of flight simulation systems may generate virtual thrust vectors representing one or more forces associated with the change in center of gravity of the user, and subsequently modulate the 6 DOF device to orient the multi-point harness to simulate a resultant trajectory of the user during the flight simulation through space.

In some embodiments, the system may include peripheral devices for simulating thruster-type devices to be donned by the user on one or more of the user's limbs. Upon detecting changes in the position or orientation of the user's limbs, the system may generate virtual physics parameters representing one or more forces associated with the change in center of gravity based on position or orientation changes of the user's limbs. Features and combination of such features will be described in the present disclosure.

In some examples, human flight vehicles may include thruster devices such as jet propulsion type devices donned on a user's limbs. Altering a position or orientation of such thruster devices may allow a user to navigate an unscripted flight. Such real-world thruster devices may generate reciprocal forces in a direction approximately opposing the direction of propulsion forces. It may be desirable to provide a system for simulating the combination of forces while a user navigates a simulated, unscripted flight.

In some embodiments described herein, the flight simulation system may include a tensioned cable and pulley system for coupling peripheral devices with the multi-point harness/6 DOF device. Such a tensioned cable and pulley system may be for simulating reciprocal forces as a peripheral device simulates real-world thruster devices.

In some scenarios, donning a multi-point harness may require specialized knowledge or a sequence of setup steps. In scenarios where the flight simulation system may be configured for entertainment purposes, it may be desirable to provide a harness device for substantially fail-proof and efficient donning by a user without any specialized flight training. Thus, in some embodiments described herein, the flight simulation system may include a harness device having a cantilevered platform extending from a U-shaped harness for securing the user during the simulated human flight. Further features and combination of such features will be described in the present disclosure.

In an aspect, the present disclosure describes a system for flight simulation comprising: a 6 degree of freedom (6 DOF) device; a multi-point harness coupled to the 6 DOF device, the multi-point harness configured to suspend a user above a ground surface; a sensor circuit integrated with a user-facing surface of the multi-point harness to detect changes in distribution of weight across the user-facing surface; a processor coupled to the sensor circuit; and a memory coupled to the processor. The memory may store processor-executable instructions that, when executed, configure the processor to: detect a shift in weight distribution across the user-facing surface of the multi-point harness; generate at least one virtual physics parameter associated with the detected shift in weight distribution, the at least one virtual physics parameter representing a force associated with a change in center of gravity of the user; and modulate the 6 DOF device to orient the multi-point harness based on the at least one virtual physics parameter to simulate a resultant trajectory of the user during the flight simulation.

Further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are for the purpose of illustration and as an aid to understanding.

Embodiments will be described, by way of example, with reference to the accompanying figures, wherein in the figures.

DETAILED DESCRIPTION

Figure 1:
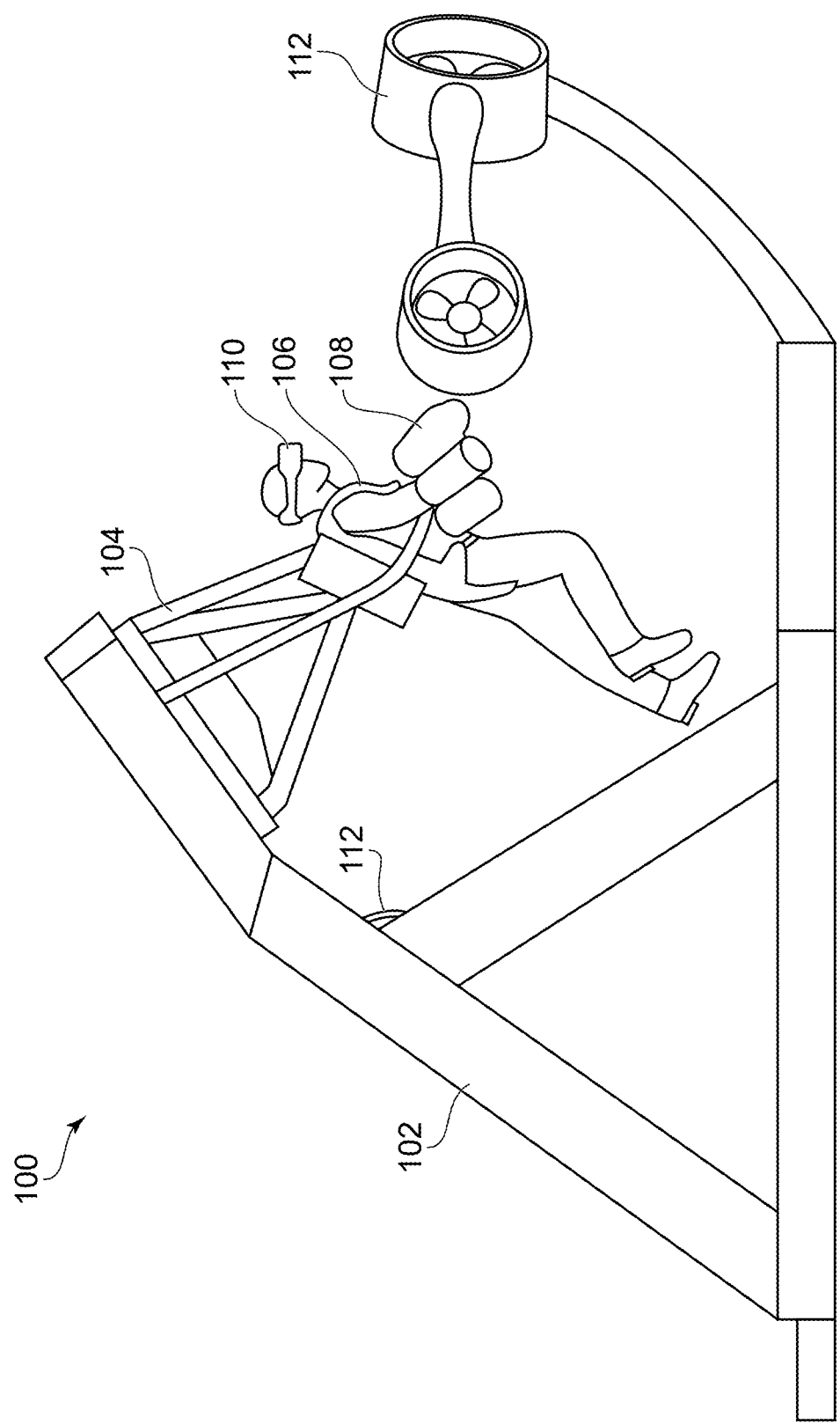
FIG. 1 illustrates a side, elevation view of a motion platform system, in accordance with embodiments of the present disclosure.

Embodiments of the present disclosure describe virtual reality-based, motion simulation systems. For ease of exposition, embodiments of the present disclosure are described as systems for simulating human flight based on real-life human-portable flight vehicle devices. Other scenarios for simulating trajectory of vehicles based on detected input based on changes to a user's center of gravity may be contemplated.

In some examples, flight simulation systems may include mechanical input devices configured to receive user input for providing a user with a simulated flight experience. To enrich or complement user input at mechanical input device, it may be desirable to provide systems of flight simulation whereby users may interact in in a non-scripted manner with a virtual world by advancing a user trajectory through space based on changes of position or orientation of the user's physical body or peripheral limbs. Numerous features or combinations of such features will be described in the present disclosure.

Powered human flight based on portable or wearable devices, such as a backpacks or user-wearable garments, for conveying a user through space are portrayed in science fiction type films. For example, such wearable devices may include pressurized hydrogen peroxide catalyzed at an output nozzle device. With such example devices, operation time durations are limited and practical use of such methods of human propulsion are relatively dangerous.

In other examples, miniaturized kerosene powered jet engines may be provided and may be intended primarily for radio-controlled aircraft. Such engine devices may be affixed to a rigid wing and may generate thrust that keep a vehicle aloft once released from an airborne platform. The vehicle may be based on a combination of lifting body (wing) in conjunction with forward thrust to maintain lift and achieve flight.

In other examples, a combination of motor sizes may be used to create a vertical lifting suit that distribute thrust to a primary unit on a user-wearable device (e.g., on a user's back). Such systems may be coupled with twin thrusters connected to the user arms for generating a ground-effect (a positive lift effect due to interactions with the surface) for raising the user a limited distance above the ground. Although such example devices have yet to gain widespread application in consumer markets, there may be a continuing desire to provide systems and platforms for user flight through air.

In some examples, indoor skydiving simulators may be configured with vertically positioned wind tunnels capable of simulating winds in excess of 120 mph. Users of such simulators may generate neutral buoyancy within a closed chamber.

In some scenarios, virtual reality headsets may be configured to augment simulated human flight. Users may interface with mechanical peripheral devices to simulate motion of wings, thereby providing a user control of a virtual flight within a simulated environment. Such example systems may provide for a platform on which the user may lie or be supported. In some examples, air-flow inducing devices, such as fans, may be provided to augment a user's haptic experience. the action of bird wings, allowing a user to control virtual flight within a simulated environment.

In some examples, a virtual wingsuit simulator device may be configured to simulate an unpowered gliding body, allowing a user to simulate gliding from mountain tops. In some examples, such simulation devices may provide photogrammetry-based environments coupled with representative physics models to simulate the forces of flight on the simulator device or user-worn suit. Such example devices may suspend a user in space based on a user-worn harness to provide a perception that the user may be flying or falling through space so that they perceive that they are in fact flying (falling) through space.

In some examples, motion systems in combination with virtual reality (VR) devices may be configured to provide a user with simulated entertainment or training environments. In some scenarios, VR devices may be configured to provide users with a virtualization of extreme, high adrenaline-associated activities without the real-world physical risks of such activities. As an illustrating example described in the present disclosure, embodiments may be configured to provide users with human flight-related activities.

In some examples, vehicle racing simulators or aircraft pilotage simulators may include 'cockpit-type' platforms to simulate virtual driving or flight experience. Such systems may integrate one or more physics engines calibrated to simulate a vehicle in a realistic manner. For example, such systems may provide acoustic or motion movement cues associated with vehicle braking/cornering action or airplane take offs and banking action.

In example human flight scenarios, users may don portable or wearable systems, such as backpacks having thrusting technology for conveying the user in space. A user may navigate based on shifting the user's bodily weight in a particular direction or altering the user's center of gravity. Such navigational actions may result in steering the portable or wearable systems. It may be desirable to provide virtual human-portable simulator devices based on motion platforms and virtual reality devices to more precisely replicate or simulate user flight through space.

Embodiments of the present application disclose motion platform systems that may include sensory platforms for detecting changes in a user's center of gravity. Such detected changes in a user's center of gravity may be for associating with thrust vectors and other associated physics parameters. Systems may be configured to provide feedback to a user in the simulated human flight environment based on such changes in the user's center of gravity. Example features of such platforms are described in the present disclosure.

VR tracking devices may be configured to identify position and orientation of a user. In some examples, VR tracking devices may be configured to identify orientation and corresponding data associated with a user's limb's or extremities. Data sets associated with orientation and corresponding data may be combined with data sets representing a user's body position to provide auxiliary data points for determining thrust vectors on a user's center of gravity. Operations for tracking a user's limb position provides additional data sets for determining a user's body orientation and movements in space.

In some examples, auditory inputs, generated by external or user head-mounted display speakers can generate a variety of layered sounds which may consist of environmental sounds (e.g., birds, wind, and traffic) as well as engine sounds and verbal cues as required.

To enrich or compliment user input received at mechanical input devices, it may be desirable to provide systems of flight simulation whereby users may interact in a non-scripted manner with a virtual world by advancing a trajectory of the user through space based on changes of position or orientation of the user's physical body or peripheral limbs. Such embodiments of flight simulation systems may be configured to simulate human-portable flight vehicles, such as human-portable flight backpacks or lifting bodies.

Embodiments of flight simulation systems described in the present disclosure may be configured as an entertainment product or as a training device for real-life human-portable flight vehicle devices.

Reference is made to FIG. 1, which illustrates a side, elevation view of a motion platform system 100, in accordance with embodiments of the present disclosure. The motion platform system 100 may be configured to include virtual reality and motion detection devices for virtualizing controlled, human-portable flight for a user. Other applications of the motion platform system 100 may be contemplated.

The motion platform system 100 includes a base 102. The base 102 may include features of a cantilevered base for suspending a user in air and above ground.

The motion platform system 100 may include a 6 degrees of freedom (6 DOF) device 104. The 6 DOF device 104 may be a linear-actuated device and may be coupled to the base 102. The base 102 may be configured to suspend the 6 DOF device 104 in an inverted position, as illustrated in FIG. 1.

The motion platform system 100 may include a multi-point harness 106 coupled to the 6 DOF device 104. In some embodiments, the multi-point harness 106 may be a 6-point harness. The multi-point harness 106 may be configured to be donned by a user, such that the user may be suspended above the ground. When suspended above the ground, the user's feet may be dangling in space about the ground.

As an example, the base 102 may include two, hollow, ½ inch, metal arms extending forward at angles of approximately 45 degrees for approximately 12 feet, kinked in the last third an additional 10 degrees. Other geometric features of the base 102 for suspending a user above the ground may be contemplated.

The arms of the base 102 may be joined by a cross-member spanning a distance of approximately 10 feet and extending 5 feed won the length of the arms to provide a substantially rigid base for mounting the 6 DOF device 104. The joinery may include carriage bolts to allow for transport and to resist fracturing at the joints from welding.

In some embodiments, along the forward portion of the arm, an extension forming an A-frame type design can extend forward and downwards, connecting to a metal base. In the present example, there may be two points of attachment per arm creating a square frame along with two additional points of attachment for the A-frame extension resulting in four corners which are bolted to the base.

In some embodiments, the base 102 may include illumination devices, power cables, networking cables, or other control cables for coupling features of the motion platform system 100.

In some embodiments, the base 102 may be constructed as a metal, hollow structure composed of ½ inch metal. The base 102 may include a step in the rear, a substantially flat platform with pre-drilled and mounted receivers for carriage bolts, which may be configured to affix the arm structure to the base.

Towards a front portion of the base 102, a top side may include two electro-mechanically driven doors configurable to be closed via spring and latch system when the system is off or loses power. These doors may be actuated electronically via the software system to reveal a bypass which can direct any downward air away from the user and towards baffles located on the side of the unit. The doors may be hinged from the centre and capable of unlatching a securing mechanism and then rotating from one end, creating an angled plane of approximately 10 degrees. In the event that electric power is lost in the motion platform system 100, the electric actuator may abut a spring-based system that may move the door to a closed position and mechanically re-engage the latching device, securing the door from movement.

Continuing with reference to FIG. 1, a front end of the motion platform system 100 may include an attachment panel for housing one or more air-flow inducing devices 112, such as fans, having various size and power. The one or more air-flow inducing devices 112 may be affixed to the motion platform system 100 via a series of bolts into the frame. Receiver apertures may be drilled and threaded fasteners may be welded thereto. Wring connections of the air-flow inducing devices may be integrated within the frame and may connect to receiving connectors within the base frame.

While a user is suspended by the motion platform system 100, one or more additional air-flow inducing devices may be mounted to A-frame pillars behind the user. Air-flow induced by such fans may be configured to simulate wind or other air-flow experienced by a user during human flight. Air-flow inducing devices may include features for imparting variable speed air-flow to the user.

In the illustrated embodiment of FIG. 1, the 6 DOF device 104 may be coupled to the base 102 in an inverted orientation and affixed with bolts to a cross-member between a pair of arms. In some embodiments, the motion platform system 100 may include a series of cables for coupling devices described herein. In some embodiments, the motion platform system 100 may include one or more wireless transceivers for coupling devices described herein.

The motion platform system 100 may be configured with one or more configurable initial positions for allowing users of different physical stature ore height to don the multi-point harness 106. When the motion platform system 100 begins operations, the 6 DOF device 104 may be configured to suspend the user above the ground, thereby imparting to the user a sense of being in mid-air flight (e.g., simulating human flight).

As will be disclosed herein, in some embodiments, the user movements resulting in physical orientation changes of the user's body may be detected. Subsequent operations of the motion platform system 100 may include actuation of the 6 DOF device 104 for imparting a sensory experience to the user for simulating human flight.

In some embodiments, the 6 DOF device 104 may include one or more mechanical stop switches, which may be used for providing a hard stop or soft stop. The mechanical switches may be for detecting input for abruptly halting or gradually halting a stop. The mechanical stop switches may be configured to interrupt software operations, and may be configured at a low-level (e.g., firmware) software level.

The 6 DOF device 104 may include an armature and one or more linkages. The 6 DOF device 104 may include a capacitive-based sensor panel configured to measure variable change in weight. As an example, variable changes in weight may be associated with changes in the center of gravity of a user suspended by the 6 DOF device 104. The motion platform system 100 may conduct operations for detecting such variable changes in weight of the user, and conduct subsequent operations for position and orientation adjustments to the 6 DOF device 104 for imparting corresponding changes to the 6 DOF device 104. Such operations for providing feedback signals to the 6 DOF device 104 may impart changes to positioning of the armature or linkages of the 6 DOF device 104, and may result in orientation changes to the user.

As an example, if a user suspended, via the multi-point harness 106, shifts its weight to the left, the motion platform system 100 may be configured to adjust positioning of the linkages of the 6 DOF device 104 for positioning the user in a tilted orientation to simulate directional changes of the user during human flight.

In some embodiments, the 6 DOF device 104 may include torque motors for driving a series of linkages, thereby translating rotational motion into linear motion.

The above-described example of the 6 DOF device 104 includes a capacitive-based sensor panel. In some other embodiments, the 6 DOF device 104 may include other types of sensor panels for detecting changes to center of gravity of the user based on the user movement.

In some embodiments, the multi-point harness 106 may include features of a metal or plastic mounting structure for coupling to the platform motion system 100. The multi-point harness 106 may include a mounting plate including a quantity of foam and a rubberized membrane on a user-facing portion of the multi-point harness 106. Other features of the multi-point harness 106 may be contemplated for providing dampening material for interfacing with the user's body.

In some embodiments, the multi-point harness 106 may be affixed to a mounting plate. When in operation, the user may step backwards towards the mounting plate, and one or more harness points may be coupled to the user and affixed such that a user may stand upright. When the user attempts a seated position, the user may remain in in place. In some embodiments, the multi-point harness 106 may include features akin to a parachute mounting harness.

In some embodiments, the motion platform system 100 may include one or more peripheral devices 108 that may be donned by the user. As an example, the peripheral devices 108 may include thruster devices affixed to the user's limbs (e.g., arms or legs). Such example thruster devices may include user interface features, and the user may utilize user interface features for modulating power of simulated thrusts.

In some embodiments, the peripheral devices 108 may include tracking devices configured to be measurable or detectable in an infrared spectrum by specialized VR motion tracking cameras. The peripheral devices 108 may include tracking devices, such that VR motion tracking cameras may identify a position or orientation of the respective peripheral devices 108. The motion platform system 100 may be configured to utilize such time-series data sets identifying a position or orientation of the respective peripheral devices 108 for supplementing data sets representing changes to a user's center of gravity to provide actuating output to a user for simulation human flight operations.

In some embodiments, peripheral devices 108 may be powered by cables coupling the peripheral devices 108 to computing devices of the motion platform system 100. In some embodiments, cables may be embedded within reinforced conduits for affixing to features of the motion platform system 100 in a flexible, unobtrusive orientation. When not in-use, the peripheral devices 108 may be configured to dangle freely from such reinforced conduits.

In some embodiments, the peripheral devices 108 may be configured to be affixed or mounted to a user's arm. The arm-mounted peripheral devices 108 may be configured to simulate jet motors or other example propulsion devices. The arm-mounted peripheral devices 108 may be configured to generate air-flow for providing haptic, sensory feedback to the user, akin to air flow produced by jet engine devices. The arm-mounted peripheral devices 108 may not produce heat (in contrast to heat generated by jet engine devices), and thus, the arm-mounted peripheral devices 108 may be suitable for operation in indoor environments and in close relative proximity to other users. In some embodiments, the peripheral devices 108 may be configured to be affixed or mounted to a user's leg or other portions of the user's body for simulating components of examples of human-portable flight vehicles.

In some embodiments, the motion platform system 100 may include one or more display devices for providing visual sensory output to the user. For example, the one or more display devices may include a virtual reality headset 110. The virtual reality headset 110 may be worn on the head of the user. The position or orientation of the virtual reality headset 110 may be tracked by external image capture devices or based on other types of sensors (e.g., accelerometers, gyroscopes, among other examples).

The virtual reality headset 110 may be configured to be donned by the user, such that the user may move their head around freely and to be immersed in a virtual and visual representation of the human flight experience. The virtual reality headset 110 may be powered by cables integrated in the motion platform system 110, such that when the virtual reality headset 110 may be dropped, the cables will not stretch, disconnect, or become damaged.

In some embodiments, the virtual reality headsets may include internal acoustic devices (e.g., speakers, among other examples) for providing acoustic output to the user.

In some embodiments, a display device may be positioned away from the motion platform system 100 for a system operator, who may monitor the sensory and visual experience of the user. In some embodiments, other types of display devices may be configured to provide an off-site projection of the sensory and visual experience of the user.

Figure 2:
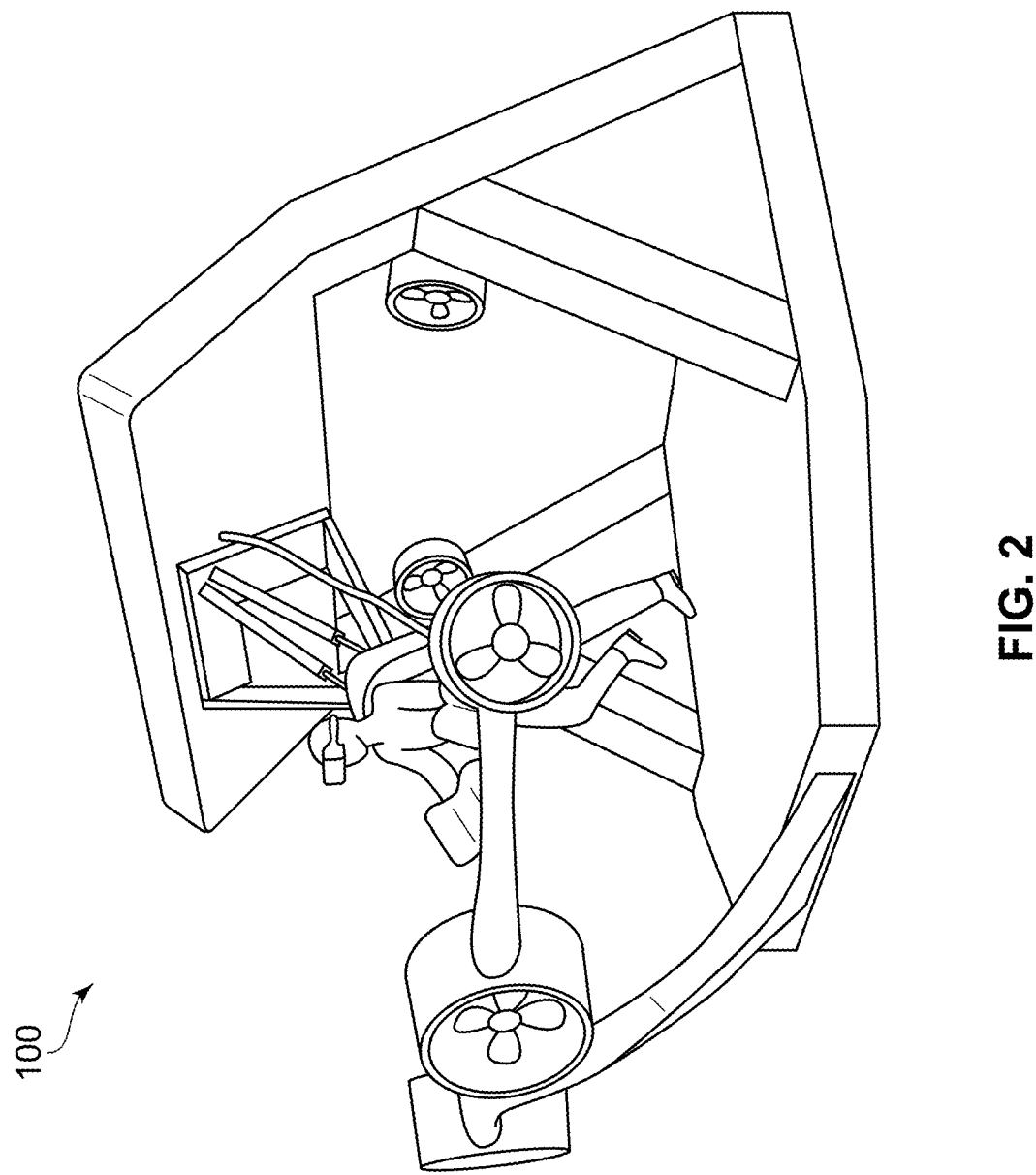
FIG. 2 illustrates an perspective, elevation view of the motion platform system of FIG. 1.

Reference is made to FIG. 2, which is an elevation, perspective view of the motion platform system 100 of FIG. 1. In FIG. 2, a multi-point harness may suspend and couple the user to a 6 DOF device, similar to the embodiments described with reference to FIG. 1.

Figure 3:
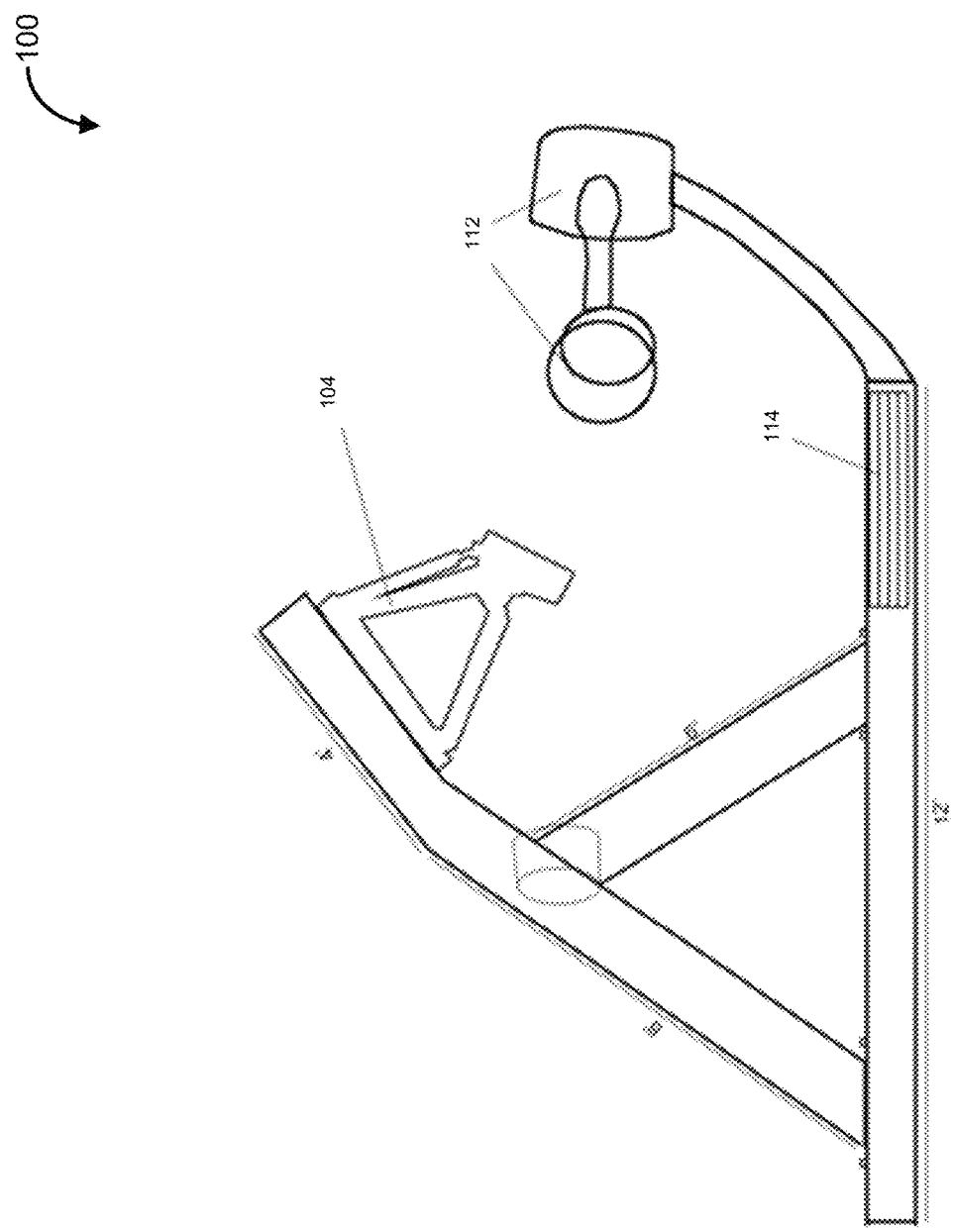
FIG. 3 illustrates a side, elevation schematic view of the motion platform system of FIG. 1.

Reference is made to FIG. 3, which shows a side, elevation schematic view of the motion platform system 100 illustrated in FIG. 1, in accordance with embodiments of the present disclosure. Illustrated in FIG. 3, the motion platform system 114 may include one or more air baffles 114. The air baffles 114 may be configured, for example, to induce air-flow towards a user suspended by the 6 DOF device 104 to simulate windy scenarios where a user may be engaging in human flight through air. In some embodiments, the air baffles 114 may be configured to reduce or redirect air-flow away a user suspended by the 6DOF device 104 to simulate a decrease in reflected air as a user gains simulated height above the ground.

Figure 4:
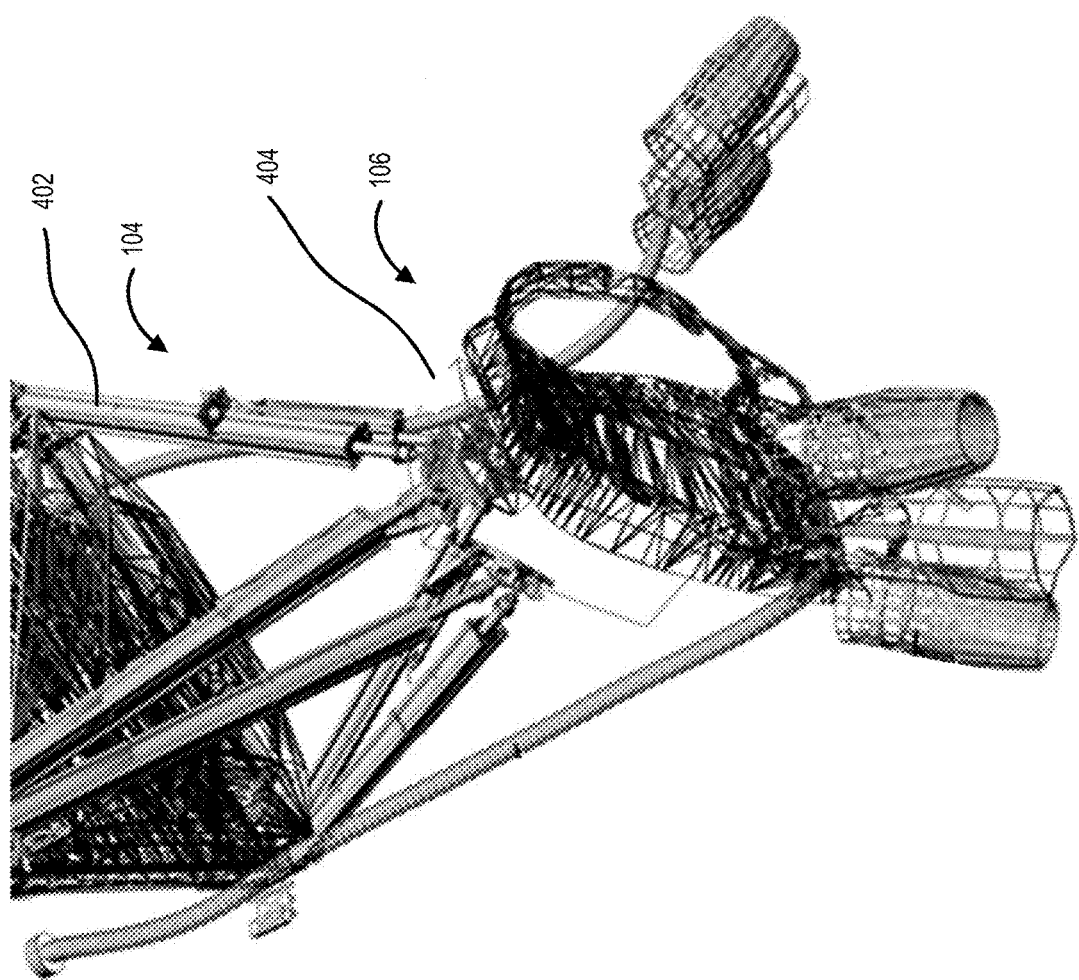
FIG. 4 illustrates an enlarged, perspective view of a multi-point harness coupled to a 6 degree of freedom (6 DOF) device, in accordance with embodiments of the present disclosure.

Reference is made to FIG. 4, which illustrates an enlarged, perspective view of the multi-point harness 106 coupled to the 6 DOF device 104 of FIG. 1. FIG. 4 illustrates example peripheral devices 108 coupled to the motion platform system 100 via one or more conduits housing electrical or networking cables therein.

In FIG. 4, the 6 DOF device 104 includes a series of linkages 402 and an armature 404 for coupling the multi-point harness 106 to the motion platform system 100.

Figure 5:
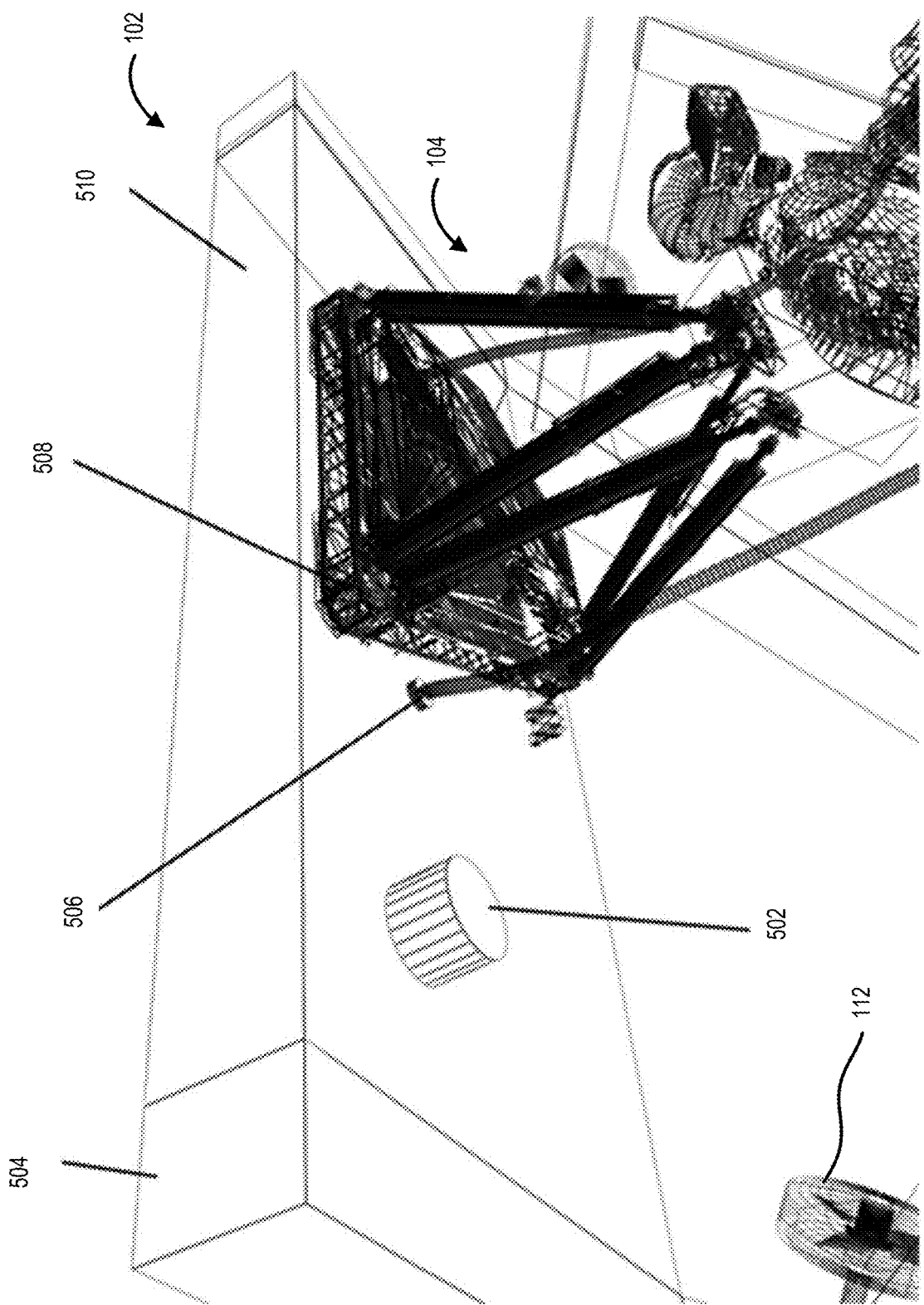
FIG. 5 illustrates an enlarged, perspective view of an interface region for coupling a 6 DOF device to a base of a flight simulation system, in accordance with embodiments of the present disclosure.

Reference is made to FIG. 5, which illustrates an enlarged, perspective view of an interface region for coupling the 6 DOF device 104 (FIG. 1) to the base 102 (FIG. 1).

In some embodiments, the base 102 may include one or more illumination devices 502. The illumination devices 502 may be configured to provide visual feedback regarding operational status of the motion platform system.

The base 102 may be constructed of features including a combination of a metal frame 504 and a detachable cross-member 510 affixed to the metal frame 504 based on carriage bolts, among other types of fasteners.

The base 102 may include one or more air-flow inducing devices 112. In FIG. 5, the illustrated air-flow inducing device 112 may be positioned at a rear position relative to a user suspended by the 6 DOF device 104.

In FIG. 5, the illustrated embodiment may include a conduit 506 for coupling peripheral devices or other devices to the motion platform system 100 (FIG. 1). Further, in some embodiments, the 6 DOF device 104 may be affixed to the base 102 via carriage bolts. Other features for coupling devices of the motion platform system 100 and for affixing devices to the base 102 may be contemplated.

As an illustration, in some embodiments, the hardware system components of the motion platform system 100 (FIG. 1) may be based on an actuated, mechanical system connected to a 6-point harness. A user may be supported by and strapped to the multi-point harness 106, and peripheral devices 108 such as hand or leg affixed devices may be strapped to the user.

In some embodiments, the motion platform system 100 may include linear actuators or cables to suspend the user such that the user's legs and feet are raised above the ground, simulating a sense of becoming airborne. The motion platform system 100 may be based on a 6-degree-of-freedom (translation in the X, Y and Z axis, roll on the X, tilting on the Y axis and yaw on the Z axis) linear actuated device, and may include features of a full motion simulator system.

In some other embodiments, a series of cables may be configured in lieu of linear actuators to provide a system for suspending a user with the ability to dynamically tilt or orient a user.

During operation of the motion platform system 100, the user may begin with an initial position, having the user's feet planted on the ground. While simulating actions to "take off" on their human flight, the motion platform system 100 may conduct operations to cause the 6 DOF device 104 to raise the multi-point harness 106, thereby imparting a sensation of lift to the user.

In some embodiments, one or more air-flow inducing devices 112 may be configured to provide variation and modulated air-flow based on a simulated horizontal speed experienced by the user of the motion platform system 100. Such operation of the air-flow inducing devices 112 may, in combination with other features of the motion platform system 100, provide haptic feedback to the user (e.g., a sense of velocity experienced by the user) as the user experiences simulated flight through a volume of air.

As described, in some embodiments, the motion platform system 100 includes one or more resistance measurement devices for detecting changes in distribution of weight experienced by the multi-point harness 106. The resistance measurement devices may include capacitive sensor devices, among other examples of sensor devices. Detectable changes in distribution of weight experienced by the multi-point harness 106 may be associated with changes to the center of gravity (COG) of the user.

The motion platform system 100 may be configured to detect how a user shifts their weight within the harness, and may be configured to generate physics parameters for providing physical feedback to the user. For example, the generated physics parameters may include thrust vectors representing forces imparted on the user or the user's center of gravity. Based on the generated physics parameters, the motion platform system 100 may be configured to alter the 6 DOF device 104 for re-positioning the user (e.g., tilting) the user based on the detected change in center of gravity of the user.

As an analogy, such operations may be configured to simulate a substantially one-to-one mapping between vehicle and body, analogous to how a user may ride a bicycle. For example, if a user were to lean to the left, the system may detect the amount of force the user imparts on the sensors of the 6 DOF device 104 and cause the actuators of the 6 DOF device 104 to induce a lean in the system and ultimately the harness. In scenarios where the user continues to lean, the 6 DOF device 104 may continue to impart operations to induce a lean.

If a user then leans to the right as a corrective action, the motion platform system 100 may detect the change in user's center of gravity and apply a counter-force, ultimately re-centring the unit to a vertical orientation. Similar operations for adjusting dynamics are provided for the X, Y and Z axis of the motion platform system 100.

While in operation, as a user prepares to virtually land and approach a virtual landing surface, the motion platform system 100 may be configured to activate or adjust the air-flow inducing devices 112 for simulating air turbulence generated by the air reflecting against the ground and back towards the user. As the user approaches the virtual ground surface, operations may be configured to actuate the 6 DOF device 104 for lowering the user to the ground, in such a manner that the user's feet may touch the ground.

Operations of embodiments of the motion platform system 100 may be generated based on open-ended, non-goal-oriented experiences, where a user may be free to virtually conduct human flight (e.g., fly) aimlessly, thereby interacting in a non-scripted manner with a virtual environment. In such scenarios, users may be free to generate their own challenges by attempting to maneuver or land on various virtual objects in a free-roaming environment.

In some embodiments, the motion platform system 100 may include operations for providing game-like settings, challenges and races, such that a user must achieve a stated goal. Such challenges might include, for example, virtual graphical user interface (GUI) type objects such as glowing rings, arrows, a virtual (HUD type) timer which indicate to a user to perform various actions in order to accrue points or achieve a race time.

In some embodiments, two or more motion platform systems 100 may be in communication, such that users may share their virtual experience with other users operating respective motion platform systems 100. Additional motion platform systems may be co-located on site or may be virtually connected via a network connection, allowing for multiplayer experiences that may render the additional users within the virtual environment and link them via a communication device.

The motion platform system 100 may be calibrated with various degrees of simulated realism, such that that a novice user may be able to achieve and maintain stable flight. For example, the motion platform system 100 may be configured to omit a selection of forces associated with flight, or to average out calculations, in such a manner as to smooth or simplify the operation of the simulated human flight vehicle.

In some scenarios, the motion platform system 100 may be configured to operate with a high degree of realism, thereby providing high precision, realistic simulation of real-world human flight experience for offering training possibilities for the real-world flight suit.

In some scenarios, embodiments of the disclosure may be configured in location-based entertainment space. Such systems may be located in various locations (e.g., malls, movie theatres, dedicated spaces, and entertainment venues) and made available to consumers for a fee for a given period of usage.

Embodiments of the motion platform system 100 may be configured as a training device for a specific powered human-portable device. The software may be configured to replicate the precise configuration or thrust vectors and lifting/drag bodies to recreate a given layout of lifting vehicle.

Figure 6:
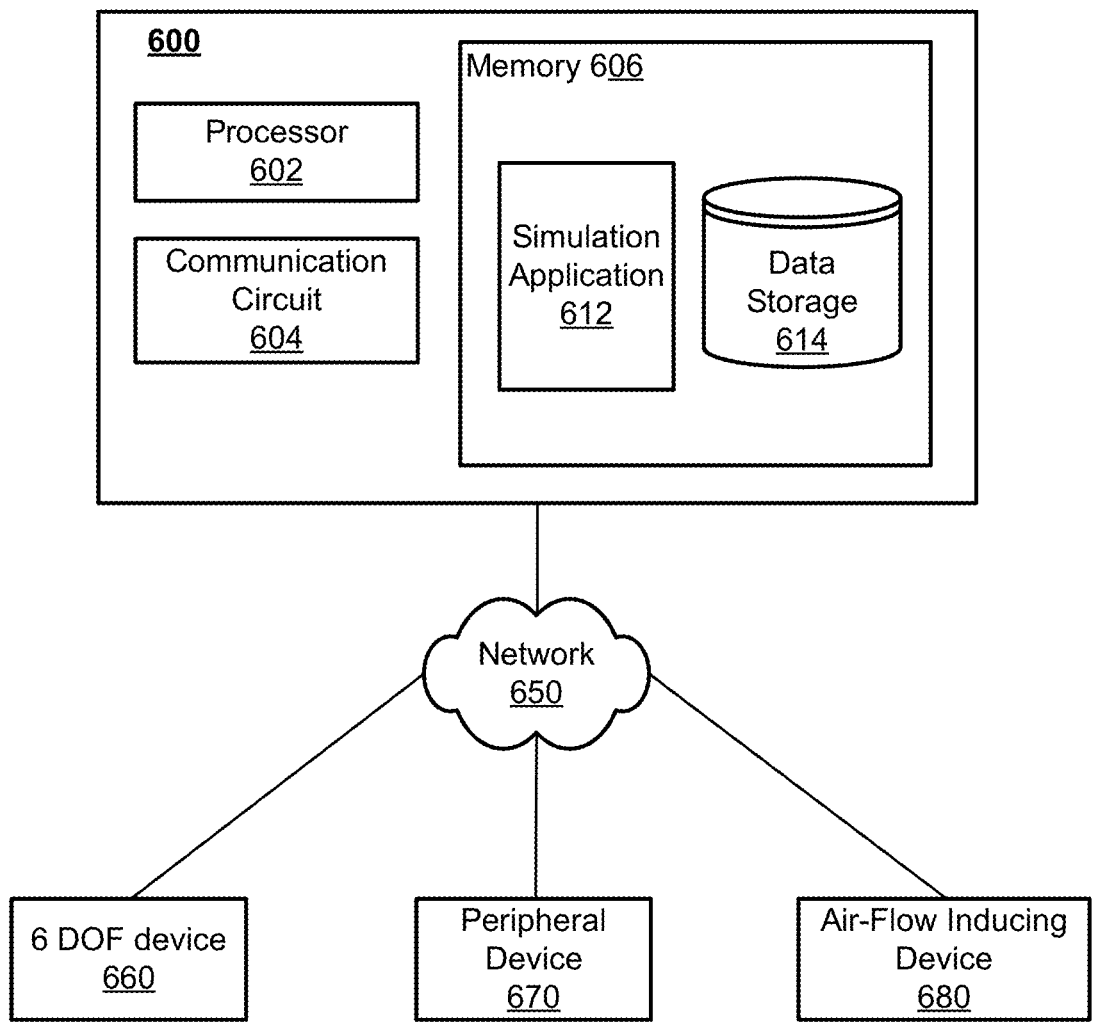
FIG. 6 illustrates a system for flight simulation, in accordance with embodiments of the present disclosure.

Reference is made to FIG. 6, which illustrates a system 600, in accordance with an embodiment of the present disclosure. The system 600 may be a computing device for the motion platform system 100 of FIG. 1.

The system 600 may transmit or receive data messages via a network 650 to or from one or more devices, such as the 6 DOF device 660, one or more peripheral devices 670, or an air-flow inducing device 680. The 6 DOF device 660, peripheral devices 670, or the air-flow inducing device 680 may correspond to the respective devices described with reference to FIG. 1. Although a sole example of the respective devices are illustrated in FIG. 6, it may be understood that any number of devices may transmit or receive data messages to or from the system 600.

The network 650 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated. In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks.

The system 600 includes a processor 602 configured to implement processor-readable instructions that, when executed, configure the processor 602 to conduct operations for flight simulation described herein. In some examples, the processor 602 may be a microprocessor or microcontroller, a digital signal processing processor, an integrated circuit, a field programmable gate array, a reconfigurable processor, or combinations thereof.

The system 600 includes a communication circuit 604 configured to transmit or receive data messages to or from other computing devices. In some examples, the communication circuit 604 may include one or more busses, interconnects, wires, circuits, or other types of communication circuits. The communication circuit 604 may provide an interface for communicating data between components of a single device or circuit.

The system 600 includes memory 606. The memory 606 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 606 may be storage media, such as hard disk drives, solid state drives, optical drives, or other types of memory.

The memory 606 may store a simulation application 112 including processor-readable instructions for conducting operations described herein. In some examples, resource allocation application 112 may include operations for flight simulation based on a motion platform system having a user suspended by a 6 DOF device 104 (FIG. 1).

The system 600 includes data storage 614. In some embodiments, the data storage 614 may be a secure data store. In some embodiments, the data storage 614 may store data sets received from the 6 DOF device 660, the peripheral device 670, or the air-flow inducing device 680. As an example, data sets received from the 6 DOF device 660 may include time-series data sets representing movement of the user or changes in the center of gravity of the user over time. In another example, data sets received from the peripheral device 670 may include position or orientation data associated with the user's limbs over time, and such data sets may be associated with simulating human flight or other applications.

The system 600 may include a graphics processing unit (GPU) (not explicitly illustrated in FIG. 6), which may be configured for rendering of graphics, or for specialized data processing operations in combination with the processor 602. In some embodiments, the GPU may receive data sets or operation instructions from the processor 602 for rendering visualizations to a display interface. In some embodiments, the display interface may be a head-mounted virtual reality display device or other display device via display interfaces such as VGA, SVGA, DVI, HDMI, USB-C or other interface connections via wired or wireless network connection.

The 6 DOF device 660 may be the 6 DOF device described with reference to FIG. 1. For example, the 6 DOF device 660 may be a linear-actuated device coupled to a multi-point harness 106 for suspending a user above the ground. The 6 DOF device 660 may be configured to detect changes in distribution of weight of a user (e.g., change in center of gravity) and, subsequently, impart changes in the 6 DOF device 660 for altering the orientation of the user (via the multi-point harness) for simulating changes in user body position as the user undergoes the human flight simulation. Other implementation features of the 6 DOF device 660 may be contemplated.

The peripheral device 670 may be donned by a user, and may include thruster type devices for affixing to a user's limbs. The peripheral device 670 may be configured to provide data sets associated with position or orientation change of the user's limbs. Changes in the position or orientation of the user's limbs may provide additional mechanisms for the user to navigate simulated human flight. In examples where the peripheral device 670 may represent thruster devices for providing propulsion to a user during a simulated human flight, the position or orientation of the user's limbs may represent further navigational context for guiding the user's flight.

The air-flow inducing device 680 may be one or more variable-speed fans for providing air-flow towards the user during operation of the system 600. The air-flow inducing device 680 may be the air-flow inducing device 112 described with reference to FIG. 1, and may be configured for providing haptic feedback to the user during the simulated flight.

In some embodiments, the simulation application 612 may be based on rendering and processing real-time engines. Example engines may include Unity, Unreal Engine, or Crytek Engine. Other processing engines may be used. In some examples, operations for computations of physics parameters may be integrated with the respective engines or may be encapsulated with stand-alone software components, such as dynamic link libraries or executable files.

In some embodiments, the simulation application 612 may include a control or operator's interface. This interface may allow for the configuration of the system and various parameters that might need to be pre-set prior to launching the activity. These parameters include, but are not limited to, the weight of the rider, the realism of the physics, and the specific virtual scenario. An example operator's station may be a separate computing device in communication with the system 600.

In some embodiments, the simulation application 612 may include 3D virtual environments and 3D assets to which the physics may be applied and rendered to the user via a virtual reality headset.

In some embodiments, the simulation application 612 may include a series of operations for defining parameters, such as the degree of accurate physical simulation, timers or rules of play, area of travel in the virtual space, the hardware's physical limiters, and safety protocols, or other predefined parameters that define the relationship between headset, virtual environment and hardware.

The simulation application 612 may include operations such that a user may experience various aspects of flight within a vectored, human-portable vehicle. The system may be predefined with multiple thrust vectors which each include independent angle of thrust, thrust envelope (variable power expressed as force), and various points of attachment which can be dynamically tracked (and therefore affixed to human body appendages).

The simulation application 612 may include operations for determining in real-time (e.g., many times a second) resultant behaviour of the vehicle (e.g., human flight devices) when the above-described forces and vectors are applied. The dynamic forces of user input may include:

A) Position of body or appendages to which thrust vectors may be assigned. For example, if users have donned peripheral devices 670 (e.g., simulated thrusters), thrusting vectors may be associated with the user's limbs. Further, as the movement and orientation of their arms would cause a change in thrust vector, the simulation application 612 may include operations to determine such changes and apply the physics to the vehicle (e.g., human flight devices).

B) Change in the user's centre of gravity (CoG) within the harness causes an unequal distribution of resistance as measured by capacitive or resistive sensor devices placed within the mechanical chain, linking the user to the actuator.

In some scenarios, an unequal change in resistance may indicate that the user is shifting weight towards a given axis, and the simulation application 612 may include operations to measure the intensity and duration of that force, and apply a similar force within the virtual environment. The resultant behaviour may be a shift in the CoG causing the vehicle to orient in the direction of force and therefore a change in the simulated human flight dynamic.

In combination with the dynamic forces of the vehicle, other forces including air density, wind, turbulence, friction and collision objects may be identified for providing resultant changes in force applied to or generated by the vehicle. Such operations may be configured to simulate human flight operations with increased precision within a virtual environment.

Figure 7:
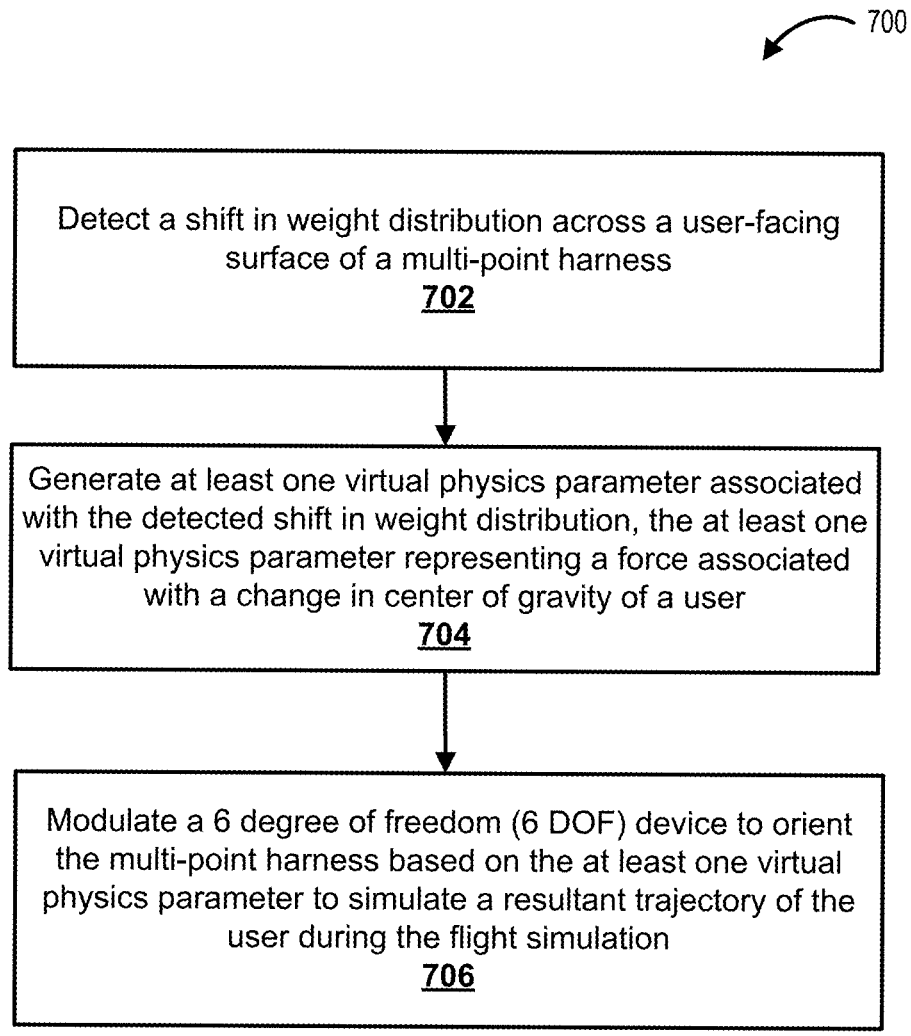
FIG. 7 illustrates a flowchart of a method for simulating flight, in accordance with embodiments of the present disclosure.

Reference is made to FIG. 7, which illustrates a flowchart of a method 700 for simulating flight, in accordance with embodiments of the present disclosure. The method 700 may be conducted by a processor of a motion platform system 100 (FIG. 1). Processor-executable instructions may be stored in a memory and may be associated with a simulation application or other processor-executable applications. Embodiments of the computing system 600 described with reference to FIG. 6 may be provided for operating the motion platform system 100. The method 700 may include operations, such as data retrievals, data manipulations, data storage, or other operations, and may include computer-executable operations.

For ease of exposition, the method 700 will be described based on human flight simulation, akin to a user donning a real-life human-portable propulsion backpack or suit which could carry a person into the air. Other examples of simulating user travel and navigation based on a user's body motion may be contemplated.

In the present example, a user navigating the human flight may include user motions for providing direction during the human flight. Examples of user motions may include movements of the user's body or limbs. As an example, the user may navigate direction of the flight by rotating the user's body for changing the user's center of gravity. In another example, the user may navigate direction of the flight by altering orientation or position of the user's limbs. In some scenarios, peripheral devices such as thrusters or propulsion devices may be donned by the user.

Reference is made again to FIG. 1 for illustrating features of the method 700. Some embodiments systems for flight simulation may include a 6 degree of freedom (6 DOF) device 104 mounted to a base 102. The system may include a multi-point harness 106 coupled to the 6 DOF device 104. The multi-point harness 106 may be configured to suspend a user above a ground surface.

The system may include a sensor circuit integrated with a user-facing surface of the multi-point harness to detect changes in distribution of weight across the user-facing surface of the multi-point harness. In some embodiments, the sensor circuit may include at least one of a capacitive sensor array or a resistive sensory array configured to detect unequal change in resistance across the user-facing surface of the multi-point harness.

In some embodiments, the system may include operations for dynamically adjusting height of the multi-point harness relative to the ground surface based on an estimated height of a prospective user. Such multi-point harness height adjustments may be desirable to allow ease of use. In some embodiments, the sensor circuit integrated with the multi-point harness may generate signals for identifying a required estimated height of the multi-point harness relative to the ground surface.

The system may include a computing device having a processor coupled to the sensor circuit. The system may include a memory coupled to the processor and store processor-executable instructions that, when executed, configure the processor to conduct operations described herein.

In some scenarios, a user may be supported by the multi-point harness 106. To begin a flight simulation, the processor may be configured to modulate the multi-point harness to lift the user above the ground upon commencing the flight simulation, thereby creating a sensation of lift.

The system may include a head-mounted virtual reality headset configured to be worn by the user suspended in the multi-point harness 106. The virtual reality headset may be coupled to the processor and may be configured to provide a visual feedback experience to the user during the flight simulation.

In some embodiments, the system may include one or more peripheral devices 108 (FIG. 1) configured to simulate user-worn thruster devices for the flight simulation. As an example, the thruster devices may simulate jet propulsion type devices for providing thrust to the user during the flight. In some embodiments, the one or more peripheral devices may include user input controls for receiving propulsion commands. The user-provided propulsion commands may represent intensity of force for propelling the user during the simulated flight. Such user-provided propulsion commands may be for simulating non-scripted human flight.

In some embodiments, the system may include one or more air-flow inducing devices 112 (FIG. 1) configured to generate air-flow proximal to the multi-point harness for a haptic or tactile sense of velocity during the flight simulation. The one or more air-flow inducing devices 112 may be positioned at an array of positions about the multi-point harness.

At operation 702, the processor may detect a shift in weight distribution across the user-facing surface of the multi-point harness 106. For example, during the flight simulation, the user may wish to navigate in a left-hand direction. The user may lean towards the user's left-side, thereby shifting the user's weight distribution. Such changes to the user's weight distribution may be associated with a change in the user's center of gravity within the multi-point harness 106, thereby causing an unequal distribution of resistance detected by a capacitive or resistive sensor array.

In some scenarios, the user may concurrently alter the position or orientation of the user's arms relative to the user's body as signals for navigating or altering the trajectory of the user during the human flight. Further, the user may provide propulsion commands via one or more peripheral devices 108 donned by the user. The propulsion commands may be representative of thruster operations for propelling the user.

Other changes in the user's body position or orientation during the flight may be detected, where the user may utilize such changes to the user's body position or orientation for signaling desired changes in trajectory of the human flight.

In substantially real-time, at operation 704, the processor may generate at least one virtual physics parameter associated with the weight distribution of the user. The at least one virtual physics parameter may represent a force associated with a change in center of gravity of the user.

In some embodiments, the processor may detect an intensity or duration of the unequal change in resistance across the user-facing surface of the multi-point harness, and may generate one or more virtual physics parameters representing that detected change in the user center of gravity (COG) within the multi-point harness. As an example, an high intensity unequal change in resistance across the user-facing surface of the multi-point harness may contribute to a more drastic directional alteration in trajectory of the flight. Further, a longer duration unequal change in resistance across the user-facing surface of the multi-point harness may contribute to a prolonged alteration in trajectory of the flight.

In some embodiments, the peripheral device 108 may be configured to include an orientation or position sensor for tracking position of the user limb in space. In some embodiments, the orientation or position sensor may include a gyroscope, accelerometer, or other types of sensors for tracking orientation or position. The processor may generate at least one physics parameter for determining a thrust vector associated with the user limb movement. As an example, a user who may extend the user's arm in a particular direction may be signaling or generating the momentum to change the user's center of gravity within the multi-point harness. Such detected movements of the user limbs may contribute to alteration in trajectory of the flight.

In some embodiments, the peripheral device 108 may include one or more fiducial markers affixed thereon, such that image capture devices (not explicitly illustrated in FIG. 1) may be configured to identify positional or rotational data for tracking the user's movement of the peripheral device 108. As the user navigates a simulated trajectory through space, the motion platform system 100 may generate one or more physics parameters representing thrust vectors associated with the peripheral devices 108, and modulate the 6 DOF device 104 to orient the multi-point harness (e.g., user received therein) based on a combination of: (a) detected shift in weight distribution across the multi-point harness (e.g., changes in user's center of gravity); and (b) thrust vectors representing changes in the position or orientation of the peripheral devices 108. Changes to the orientation of the multi-point harness may represent a simulation of a virtual human-portable flight vehicle.

In some embodiments, the peripheral device 108 may be configured to simulate user-worn thruster devices for flight simulation. The peripheral device 108 may include an input device for receiving propulsion commands for simulating non-scripted human flight simulation. In such a scenario, the processor may generate at least one physics parameter for determining an angle of thrust or thrust power envelope representing simulated change of gravity of the user, thereby altering the trajectory of the user during the flight.

In some embodiments, to bolster the realism of the flight simulation, the processor may determine thrust vectors associated with simulated air density, wind, friction, or collision objects for providing haptic feedback for the flight simulation.

One or a combination of the above-described embodiments of generated physics parameters may represent virtual thrust vectors acting on the user while suspended in the multi-point harness.

At operation 706, the processor may modulate the 6 DOF device 104 to orient the multi-point harness 106 based on the one or combination of virtual physics parameters for simulating a resultant trajectory of the user during the flight simulation.

In some embodiments, the system may modulate the multi-point harness to alter the user's height relative to the ground for providing haptic sensations of lift or descend during the flight. In some embodiments, the system may modulate the air-flow inducing device for generating variable intensity of air flow to provide haptic sensations to the user during the flight.

In some embodiments, the system may provide an immersive visual output to the user via a head-mounted virtual reality headset 110 to provide a fully immersive experience to the user during the flight.

In some embodiments, the system may be configured to provide a human flight experience to users based on one or more of an array of flight experience levels. For example, inexperienced flight users may be unable to achieve or maintain stable flight. To provide an iterative learning experience, the system may be configured to omit a subset of thrust vectors or may be configured to average out sensor data for determining virtual thrust vectors, thereby smoothing or simplifying the trajectory of the human flight. Such operations may provide a "more forgiving" user interface experience for the flight experience.

In another scenario, the system may be configured to provide a simulated flight experience with a high degree of realism to simulate a substantially real-world experience of human flight utilizing portable user-worn propulsion devices for space flight. Such configurations for a simulated flight may result in the system configuring the flight trajectory based on a combination of numerous thrust vectors acting on the user. Such configurations may require the user to precisely modulate bodily movements for navigating trajectory of the flight.

In some embodiments described herein, a motion platform system may include a multi-point harness 106 (FIG. 1) donned by a user for suspending the user above the ground. The multi-point harness 106 may include numerous anchor points for securing a user within the multi-point harness 106. In scenarios, donning the multi-point harness 106 may require specialized knowledge and a sequence of setup steps. It may be desirable to provide a harness device for substantially fail-proof and efficient donning by a user.

As described in some examples herein, thruster devices may be jet propulsion type devices for providing thrust to a user during flight. A user may done a thruster device and may navigate an unscripted flight using the thruster device by altering a position or orientation of the thruster device. In some embodiments, peripheral devices 108 (FIG. 1) may be configured to simulate thruster devices.

In some scenarios, real-world thruster devices for generating propulsion forces may generate reciprocal forces in a direction approximately opposing the direction of the propulsion forces. For a user to maintain a forward center of gravity while donning the thruster devices, the user may need to generate a leaning force to counteract the reciprocal forces. In some scenarios, the user may counteract the reciprocal forces by transferring the user's weight into the thruster devices. While transferring the user's weight into the thruster devices, the user may feel as if they are bouncing on a cushion of air. It may be desirable to provide a motion platform system for simulating such an experience of a user navigating an unscripted flight using thruster devices.

Figure 8:
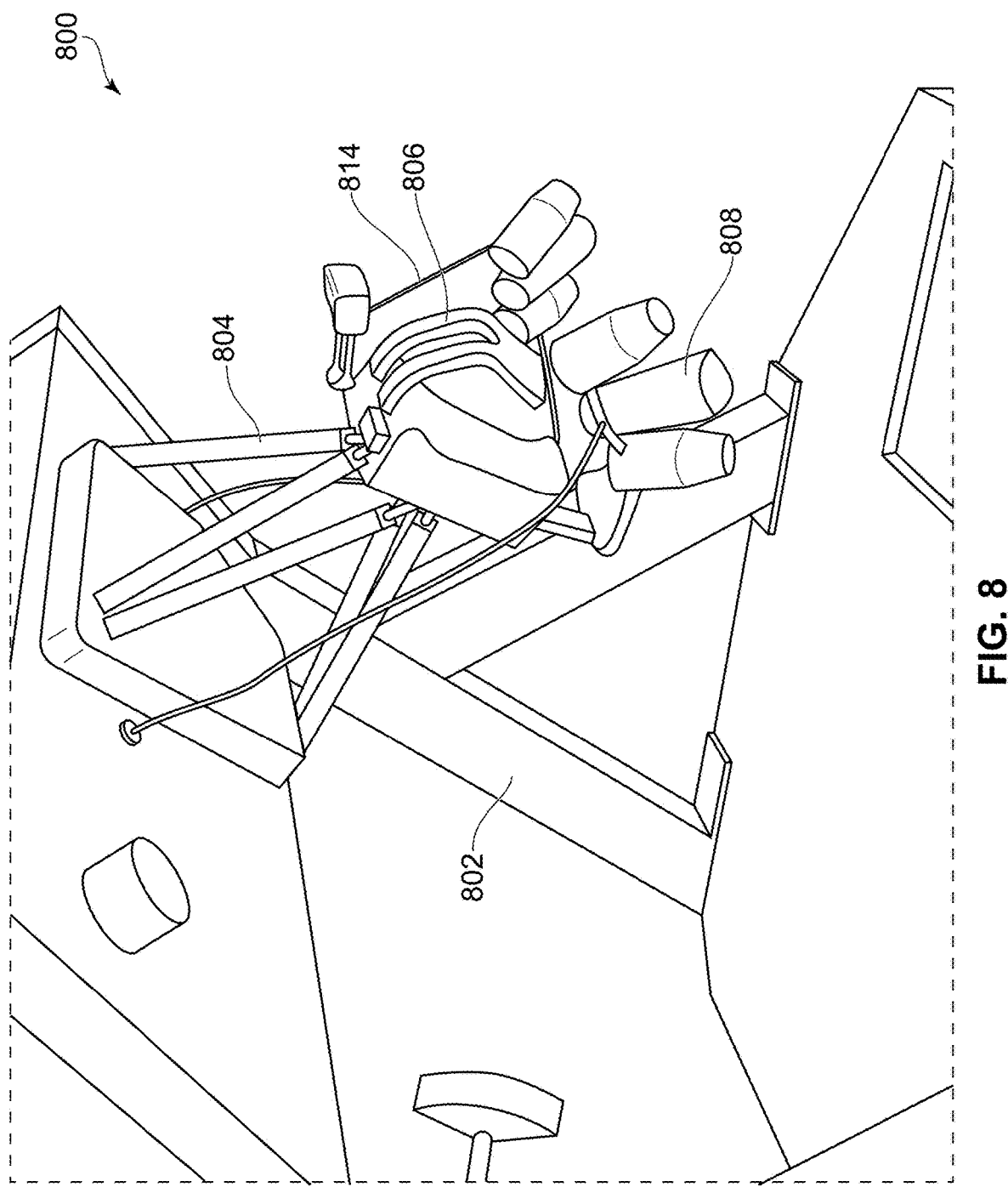
FIG. 8 illustrates a perspective view of a motion platform system, in accordance with embodiments of the present disclosure.

Reference is made to FIG. 8, which illustrates a perspective view of a motion platform system 800, in accordance with embodiments of the present disclosure. The motion platform system 800 may be configured to include virtual reality and motion detection devices for virtualizing controlled, human-portable flight for a user. Other applications of the motion platform system 800 may be contemplated.

The motion platform system 800 may include a base 802. The base 802 may include features of a cantilevered base for suspending a user in air and above ground, similar to the base 102 described with reference to FIG. 1.

The motion platform system 800 may include a 6 degrees of freedom (6 DOF) device 804. The 6 DOF device 104 may be a linear-actuated device and may be coupled to the base 802. The base 802 may be configured to suspend the 6 DOF device 804 in an inverted position, similar to the embodiment described with reference to FIG. 1.

The motion platform system 800 may include a harness device 806 coupled to the 6 DOF device 804. In some embodiments, the harness device 806 may include a U-shaped harness adapted to interface with a user's upper body. The harness device 806 may include a cantilevered platform extending from the U-shaped harness. In some embodiments, the U-shaped harness may be configured in a lock position during operation of the motion platform system. The locking or unlocking of the U-shaped harness relative to the user may be based on a pneumatic, mechanical lock system. Features of embodiments of the harness device 806 are further illustrated in subsequent drawings.

The harness device 806 may support a user, such that the user may be suspended above the ground. In some embodiments, the cantilevered platform may be adapted to provide a seating surface to the user. In some embodiments, the position of the cantilevered platform relative to the U-shaped harness may be dynamically adjusted to accommodate a range of user heights or sizes.

In some embodiments, the U-shaped harness may be adapted to be donned by a user and may be an over-the-shoulder device for coupling the user to the 6 DOF device 804 during operation. Although the harness device 806 is illustrated as a U-shaped harness, it may be appreciated that other shapes or configurations for the harness may be contemplated.

Similar to the embodiments described with reference to FIG. 1, the 6 DOF device 804 may be coupled to the base 802 in an inverted orientation and affixed with bolts to a cross-member between a pair of arms. The 6 DOF device 804 may be configured to suspend the user above the ground, thereby imparting to the user a sense of being in mid-air flight (e.g., simulating human flight).

In some embodiments, the 6 DOF device 804 may include a sensor panel configured to detect variable change in weight across the U-shaped harness. The sensor panel may be a capacitive-based sensor panel, to detect variable change in weight. Variable changes in weight may be associated with changes in the center of gravity of a user suspended by the 6 DOF device 804.

The motion platform system 800 may conduct operations for detecting variable changes in weight of the user, and conduct subsequent operations for imparting position and orientation adjustments to the 6 DOF device 804. Such operations for providing feedback signals to the 6 DOF device 804 may impart changes to positioning of armature or linkages of the 6 DOF device 804, and may result in orientation changes to the user who may be suspended in the air.

As an example, in the scenario where a suspended user shifts its weight to the left, the motion platform system 800 may be configured to adjust positioning of the linkages of the 6 DOF device 804 for positioning the user in a tilted orientation to simulate directional changes of the user during human flight. In some embodiments, the 6 DOF device 804 may include torque motors for driving a series of linkages, thereby translating rotational motion into linear motion.

In some embodiments, the motion platform device 800 may include one or more peripheral devices 808 adapted to be donned by the user at the user's arms. The peripheral devices 808 may be adapted to simulate thruster devices affixed to the user's limbs (e.g., arms or legs). Such example thruster devices may include user interface features, and the user may utilize user interface features for modulating power of simulated thrusters.

In some scenarios, real-world thruster devices may generate reciprocal forces in a direction opposing a direction of thruster propulsion. For a user to maintain a forward center of gravity, the user may need to generate a leaning force by transferring the user's weight into the thruster device. To simulate one or a plurality of force components associated with a thruster device, embodiments of the peripheral devices 808 being coupled to the harness device 806 via a tensioned cable and pulley system 814. The tensioned cable and pulley system 814 may mechanically couple the peripheral devices 808 to the harness device 806 and to the 6 DOF device 804.

In some embodiments, the harness device 806 may include a torque motor to provide, via one or more pulleys, variable tension to the cable coupled to the peripheral device. Via the cable and pulley system, adjustments to the torque motor may be adapted to simulate reciprocal forces of the peripheral devices 808. In some embodiments, other types of motors, such as stepper motors, among other examples, may be configured to provide variable tension to the cable coupled to the peripheral device.

In some embodiments, the torque motor may be an electro-magnetically driven torque motor with variable tension for simulating a range of reciprocal forces. The variation in tension for simulating a range of reciprocal forces may be correlated to the effect of simulated propulsion forces generated by thrusters. As a magnitude of the simulated reciprocal forces vary, the user may counteract the reciprocal forces for maintaining a forward center of gravity during the simulated human flight session. In some embodiments, the electro-magnetically driven torque motor may be positioned within the harness device 806 or within the 6 DOF device 804.

Figure 9:
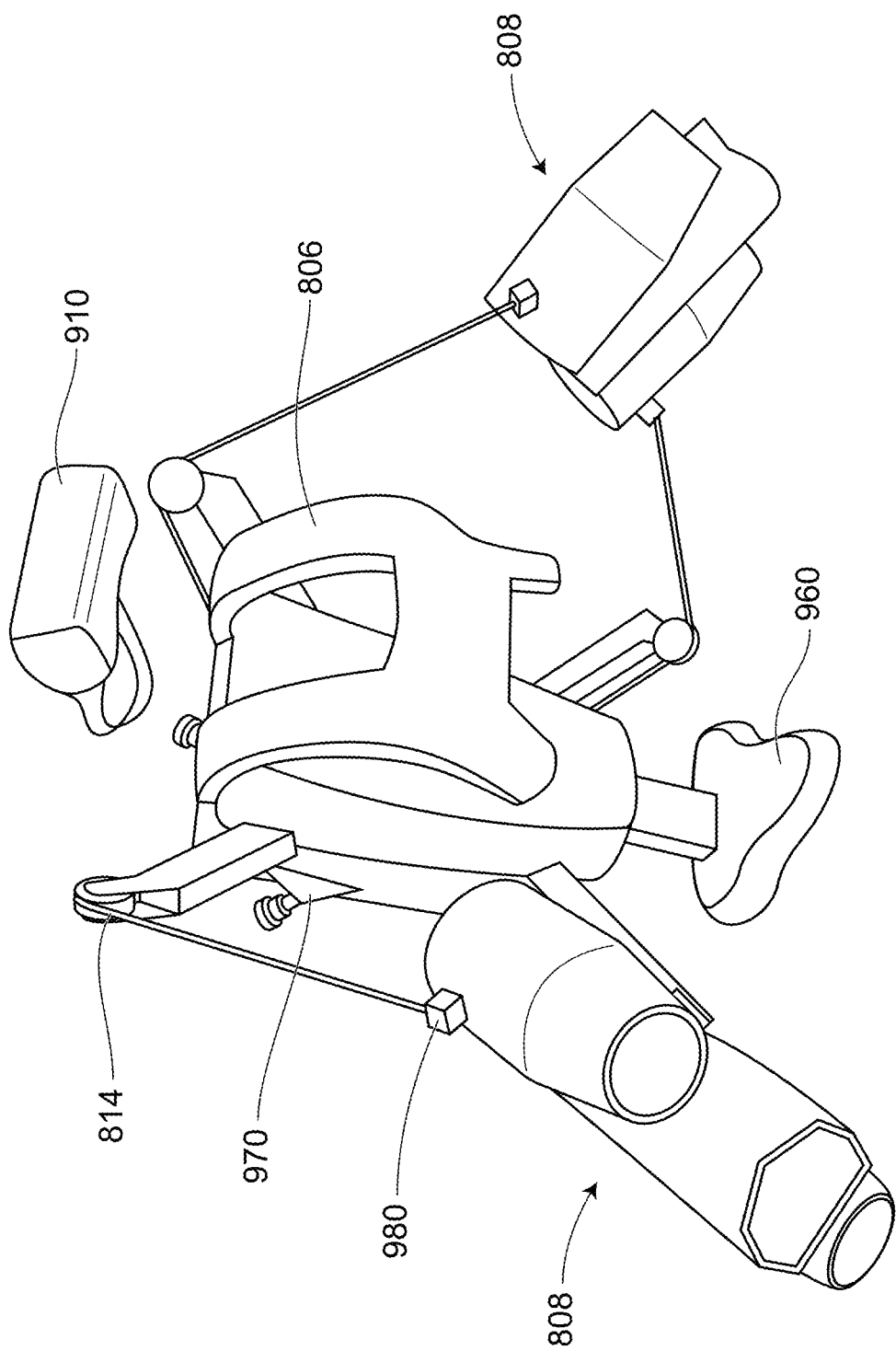
FIG. 9 illustrates an enlarged, perspective view of the harness device, peripheral devices, and a virtual reality headset, in accordance with embodiments of the present disclosure.

Reference is made to FIG. 9, which illustrates an enlarged, perspective view of the harness device 806, peripheral devices 808, and a virtual reality headset 910, in accordance with embodiments of the present disclosure.

In FIG. 9, the harness device 806 may include a U-shaped harness adapted to interface with a user's upper body. On a user-facing surface of the harness device 806, a sensor circuit may be integrated thereon for detecting alterations in distribution of weight across the user-facing surface of the harness device 806.

In some embodiments, the harness device 806 may include a cantilevered platform 960 adapted to provide a surface on which the user may position themselves to the harness device 806. In some embodiments, the cantilevered platform 960 may be coupled to the harness device 806 at an orientation such that a user donning the harness device 806 may be positioned in a 'leaned forward' position relative to a vertical axis above a ground.

In FIG. 9, the peripheral devices 808 may be coupled to the harness device 806 via the tensioned cable and pulley system 814. In some embodiments, a tensioned cable may be configured for coupling a peripheral device 808 (at a pivoting mount 980) to an electric drive motor 970. In some embodiments, the electric drive motor 970 may be an electro-mechanically driven torque motor and may generate variable cable tension for simulating reciprocal forces of the peripheral device 808. The electric drive motor 970 may vary the cable tension based on changing position or orientation of the peripheral device 808 in space or based on input provided to the peripheral device 808 by the user. For example, the peripheral device 808 may include user interfaces for receiving user input for generating a magnitude of propulsion forces.

In some embodiments, the harness device 806 may include a biasing system (not explicitly illustrated in FIG. 9) coupled to the tensioned cable and pulley system 814. The biasing system may be configured to provide the user with a sense that limbs donning the peripheral devices 808 may be interacting with or bouncing on a cushion of air.

In some embodiments, the biasing system may be combined with the electric device motor 970 for providing the reciprocal force. In the present example, the electric device motor 970 may be configured to generate coarse grain refinements to the reciprocal forces and the biasing system may be configured to generate a static sense of buoyancy.

Figure 10:
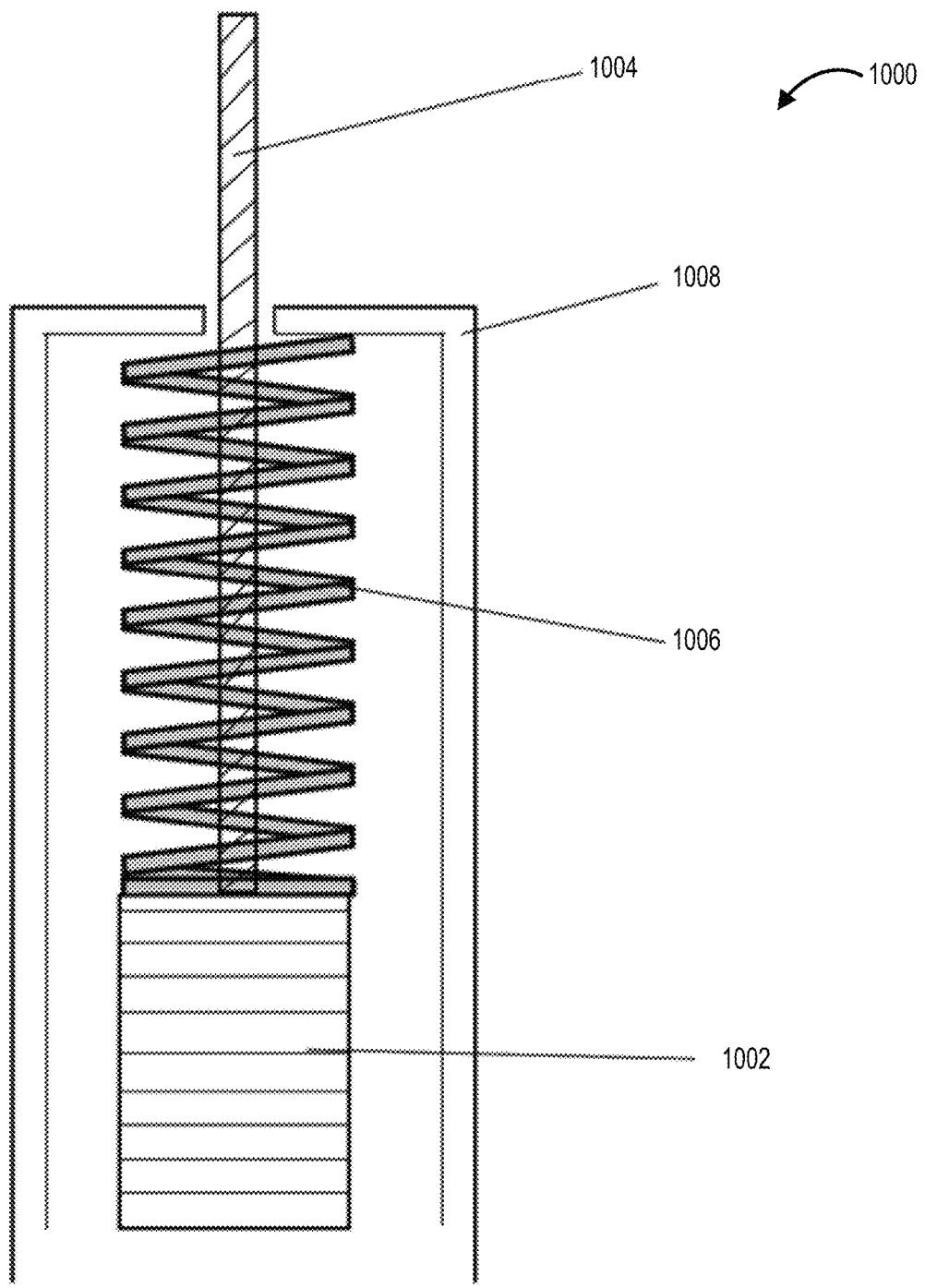
FIG. 10 illustrates a cross-sectional, elevation view of a biasing system, in accordance with embodiments of the present disclosure.

Reference is made to FIG. 10, which illustrates a cross-sectional, elevation view of a biasing system 1000, in accordance with embodiments of the present disclosure. In some embodiments, the biasing system 1000 may be combined with the electric device motor 970 at the harness device 806 (FIG. 8, FIG. 9) for generating simulated reciprocal forces described in the present disclosure.

In some embodiments, the biasing system 1000 may include a cable tie and spring mount 1002. The cable tie and spring mount 1002 may be coupled to a cable 1004 for connecting with a peripheral device 808 at a pivoting mount 908 (FIG. 9). Further, the cable tie and spring mount 1002 may have a biasing spring 1006 received thereon. A combination of the cable tie and spring mount 1002 and the biasing spring 1006 may be received within a housing 1008.

In some embodiments, the biasing system 1000 may be integrated with the electric device motor 970 to provide the user with a sense that limbs donning the peripheral devices 808 may be interacting with or bouncing on a cushion of air.

In some scenarios, the sensation of interacting with or bouncing on a cushion of air may be based on one or more of: (1) features of the biasing system 1000 characterized by a mechanical absorption factor for simulating a "cushion of air" at the peripheral devices 808; or (2) electric drive motor 970 (which can be an electro-magnetically driven torque motor) for generating variable tension to simulate a range of reciprocal force of simulated thruster devices. The reciprocal force may be experienced by the user as the user transfers weight towards the peripheral device 808 for maintaining a forward center of gravity during the simulated human flight.

Figure 11:
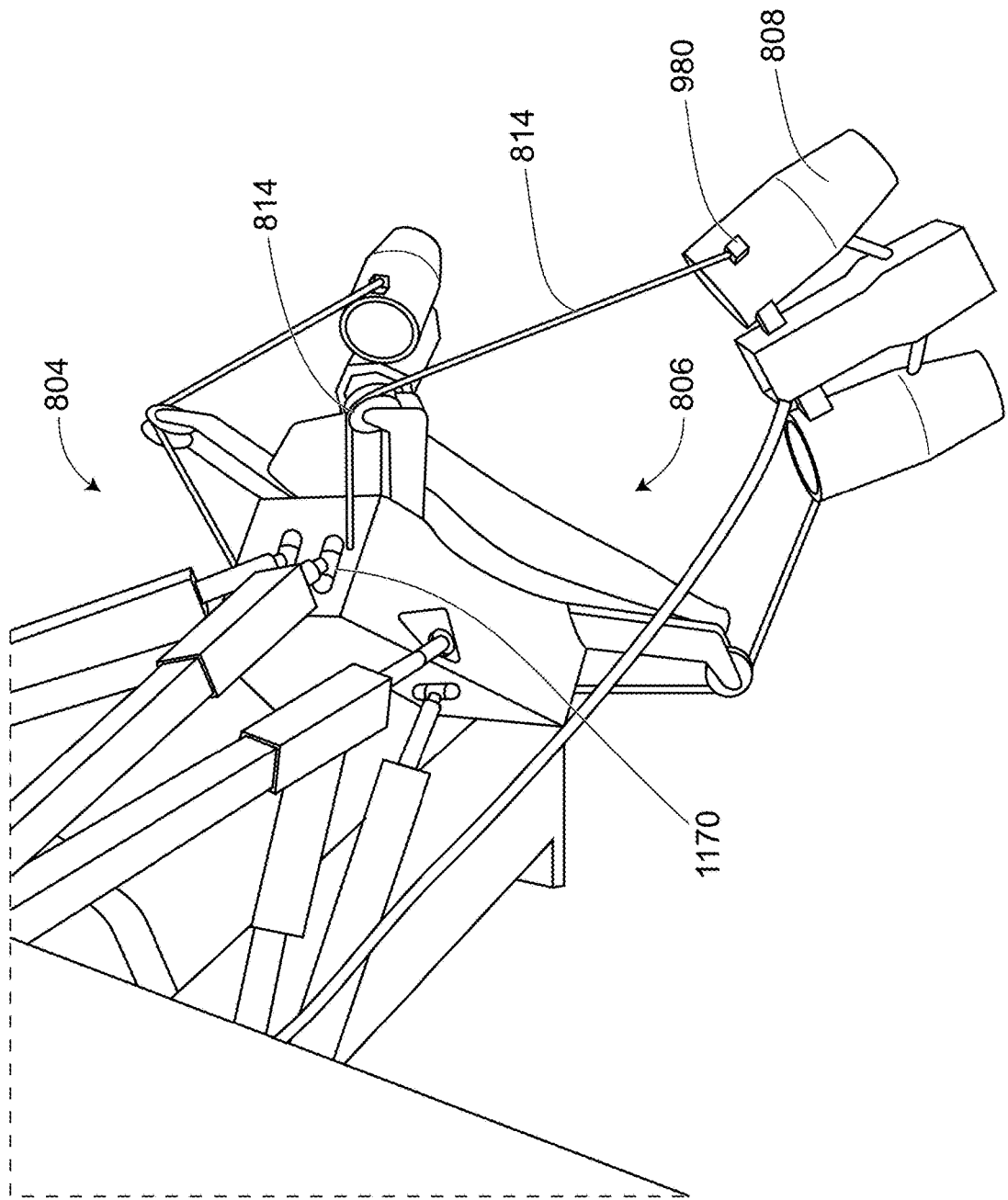
FIG. 11 illustrates a rear, enlarged perspective view of a harness device and peripheral device, in accordance with an embodiment of the present disclosure.

Reference is made to FIG. 11, which illustrates a rear, enlarged perspective view of the harness device 806 and peripheral devices 808 of FIG. 8. As illustrated in FIG. 11, the electric device motor 970 and the biasing system 1000 may be combined at an interface 1170 of the harness device 806 and the 6 DOF device 804.

Shown in FIG. 11, the tensioned cable and pulley system 814 may be for coupling the one or more thruster devices 808 to the harness device 806. The tensioned cable and pulley system 814 may be coupled with other components of the motion platform system for providing a platform for simulating unscripted human flight to a user. For example, the tensioned cable and pulley system 814 may be configured to simulate a reciprocal force at a thruster device, such that the user may transfer the user's weight into the thruster device for maintaining a forward center of gravity position. Whilst the user transfers weight into the thruster device, embodiments of features disclosed herein may provide a sensation to the user that they are bouncing on a cushion of air.

Several examples described herein for describing embodiments of the present disclosure may relate to systems for simulating human flight. It may be appreciated that embodiments of the present disclosure may be configured for simulating other types of user experiences involving a user precisely modulating bodily movements for navigating simulated vehicular movement.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A system for flight simulation comprising:
   a 6 degree of freedom (6 DOF) device;
   a multi-point harness coupled to the 6 DOF device, the multi-point harness configured to suspend a user above a ground surface;
   a sensor circuit integrated with a user-facing surface of the multi-point harness to detect changes in distribution of weight across the user-facing surface;
   a processor coupled to the sensor circuit; and
   a memory coupled to the processor and storing processor-executable instructions that, when executed, configure the processor to:
      detect a shift in weight distribution across the user-facing surface of the multi-point harness;
      generate at least one virtual physics parameter associated with the detected shift in weight distribution, the at least one virtual physics parameter representing a force associated with a change in center of gravity of the user; and
      modulate the 6 DOF device to orient the multi-point harness based on the at least one virtual physics parameter to simulate a resultant trajectory of the user during the flight simulation.

2. The system of claim 1, wherein the sensor circuit includes at least one of a capacitive sensor array or a resistive sensor array configured to detect unequal change in resistance across the user-facing surface of the multi-point harness,
   and wherein the processor-executable instructions, when executed, configure the processor to:
   determine an intensity or duration of the unequal change in resistance across the user-facing surface of the multi-point harness; and
   generate one or more virtual physics parameters representing a change in the user center of gravity (COG) within the multi-point harness.

3. The system of claim 1, further comprising:
   a peripheral device donned by the user, the peripheral device configured to be donned on a user limb, wherein the peripheral device including at least one orientation or position sensor device for tracking position of the user limb in space,
   and wherein generating the at least one physics parameters includes determining a thrust vector associated with the user limb movement.

4. The system of claim 3, wherein the peripheral device is configured to simulate user-worn thruster devices for flight simulation, the peripheral device includes a input device for receiving propulsion commands for simulating non-scripted human flight simulation,
   and wherein generating the at least one physics parameters includes determining at least one of angle of thrust or thrust power envelope representing simulated change of gravity of the user.

5. The system of claim 1, further comprising: a head-mounted virtual reality headset configured to be worn by a user suspended in the multi-point harness, the virtual reality headset configured to provide a visual feedback experience for the flight simulation.

6. The system of claim 1, wherein generating the at least one physics parameters includes determining a thrust vector associated with simulated air density, wind, friction, or collision objects to provide haptic feedback for the flight simulation.

7. The system of claim 1, wherein the processor-executable instructions, when executed, configure the processor to: modulate the multi-point harness to lift the user above the ground upon commencing the flight simulation.

8. The system of claim 1, further comprising: an air-flow inducing device configured to generate air-flow proximal to the multi-point harness for a haptic sense of velocity during the flight simulation.

9. The system of claim 1, wherein the processor-executable instructions, when executed, configure the processor to: retrieve a flight simulation level setting for configuring a degree or realism for the flight simulation,
   and wherein generating the at least virtual physics parameters includes averaging out simulated forces to simplify the flight simulation for a novice flight simulation user.

10. The system of claim 3, further comprising a cable and pulley system coupling the multi-point harness and the peripheral device for providing reciprocal force feedback to the user during user flight simulation.

11. The system of claim 10, further comprising an electromagnetically driven torque motor to generate variable tension for the cable and pulley system.

12. The system of claim 11, further comprising a biasing system coupled to the cable and pulley system adapted to simulate user sensation of bouncing on a cushion of air.

13. The system of claim 1, wherein the multi-point harness includes a cantilevered platform adapted to position the user within the flight simulation system.

14. The system of claim 13, wherein positioning of the cantilevered platform relative to a U-shaped harness is dynamically determined based on a user height.

* * * * *